(12) United States Patent
Specht et al.

(10) Patent No.: US 12,629,990 B2
(45) Date of Patent: May 19, 2026

(54) DRIVE DEVICE FOR DRIVING A ROLLER BLIND DEVICE OF A FRAMELESS VEHICLE WINDOW

(71) Applicant: HS PRODUCTS ENGINEERING GMBH, Maisach (DE)

(72) Inventors: Martin Specht, Feldafing (DE); Ullrich Juling, Prien (DE); Florian Dorschel, Herrsching (DE)

(73) Assignee: HS PRODUCTS ENGINEERING GMBH, Maisach (DE)

( * ) Notice: Subject to any disclaimer, the term of this patent is extended or adjusted under 35 U.S.C. 154(b) by 83 days.

(21) Appl. No.: 17/438,458

(22) PCT Filed: Mar. 12, 2020

(86) PCT No.: PCT/EP2020/056714
§ 371 (c)(1),
(2) Date: Sep. 12, 2021

(87) PCT Pub. No.: WO2020/182960
PCT Pub. Date: Sep. 17, 2020

(65) Prior Publication Data
US 2022/0126652 A1 Apr. 28, 2022

(30) Foreign Application Priority Data
Mar. 12, 2019 (DE) ..................... 10 2019 106 299.3

(51) Int. Cl.
B60J 1/20 (2006.01)
(52) U.S. Cl.
CPC ............. B60J 1/2027 (2013.01); B60J 1/205 (2013.01); B60J 1/2061 (2013.01)

(58) Field of Classification Search
CPC ...... B60J 1/2086; B60J 1/2022; B60J 1/2025; B60J 1/2027; B60J 1/2033; B60J 1/2063; B60J 1/2061
See application file for complete search history.

(56) References Cited

U.S. PATENT DOCUMENTS

| | | | | |
|---|---|---|---|---|
| 7,493,933 B2 * | 2/2009 | Li | ........................... | B60J 1/2075 160/310 |
| 7,537,039 B2 * | 5/2009 | Fischer | ................. | B60J 1/2086 160/90 |

(Continued)

FOREIGN PATENT DOCUMENTS

| | | |
|---|---|---|
| DE | 20 2007 008 178 U1 | 8/2007 |
| DE | 20 2007 015 541 U1 | 2/2008 |

(Continued)

OTHER PUBLICATIONS

Brose, DE 202007012954 Machine translation; retrieved from https://worldwide.espacenet.com/publicationDetails/biblio?CC=DE&NR=202007012954U1&KC=U1&FT=D&ND=3&date=20090205&DB=&locale=en_EP (Year: 2009).*

(Continued)

*Primary Examiner* — Abe Massad
(74) *Attorney, Agent, or Firm* — Nixon Peabody LLP

(57) ABSTRACT

Provided is a drive device for driving a roller device of a frameless vehicle window, including a drive rod with an upper roller end for the fixation to a curtain rod of a roller curtain of the roller device and a lower covering end, wherein the drive rod is movably supported between a cover position and a release position, further including a drive drum and an at least partially flexible drive fixed to the roller end or to the covering end of the drive rod and at least partially wraps around the drive drum in a force-transmitting manner for transmitting a drive force to the drive rod for a (Continued)

Figure 2:
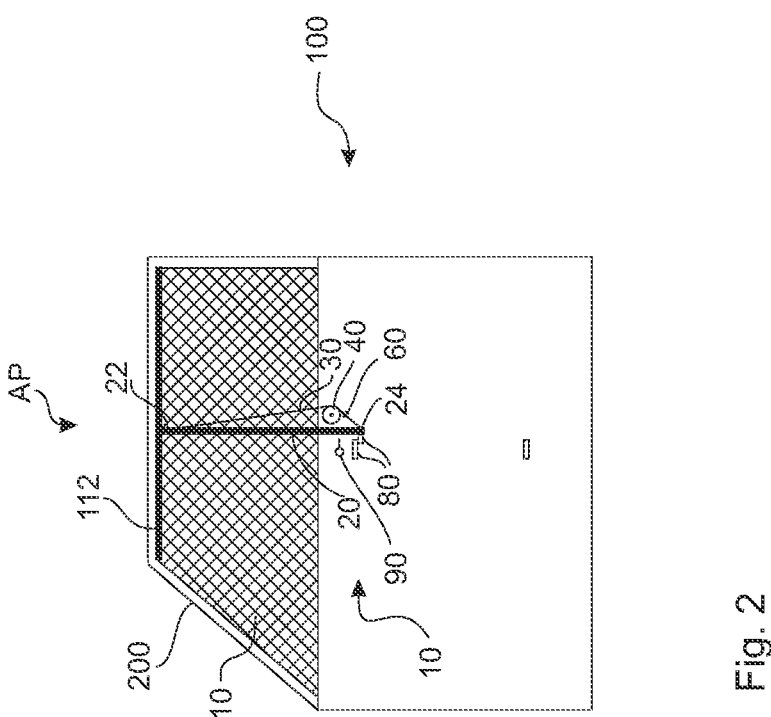

movement of the drive rod between the cover position and the release position during a rotation of the drive drum.

17 Claims, 5 Drawing Sheets

(56) References Cited

U.S. PATENT DOCUMENTS

| | | | | | |
|---|---|---|---|---|---|
| 7,717,158 | B2 * | 5/2010 | Lekar | | B60J 1/2086 |
| | | | | | 160/310 |
| 8,104,822 | B2 * | 1/2012 | Kriese | | B60J 1/2086 |
| | | | | | 160/370.21 |
| 10,286,758 | B2 * | 5/2019 | Seel | | B60J 1/2086 |
| 10,449,838 | B2 * | 10/2019 | Jonas | | B60J 1/2038 |
| 2008/0216973 | A1 * | 9/2008 | Walter | | B60J 1/2086 |
| | | | | | 160/313 |
| 2008/0223531 | A1 | 9/2008 | Lekar et al. | | |
| 2017/0136855 | A1 * | 5/2017 | Yasuda | | B60J 1/2013 |
| 2017/0361686 | A1 * | 12/2017 | Seel | | B60J 1/2025 |

FOREIGN PATENT DOCUMENTS

| | | | |
|---|---|---|---|
| DE | 20 2007 015 434 U1 | 3/2008 | |
| DE | 10 2007 012 978 A1 | 9/2008 | |
| DE | 20 2007 012 954 U1 | 3/2009 | |
| DE | 20 2008 009 763 U1 | 12/2009 | |
| DE | 10 2007 063 705 B4 | 3/2011 | |
| EP | 1 972 477 A2 | 9/2008 | |

OTHER PUBLICATIONS

German Office Action for corresponding DE 10 2019 106 299.3, with summarized translation, 7 pages, mailed May 25, 2022.
German Patent Office, Examination Report in Application No. 20727809.4, dated Apr. 26, 2024, in German (6 pages).

* cited by examiner

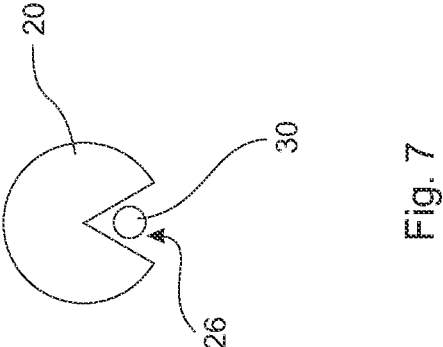
Fig. 7
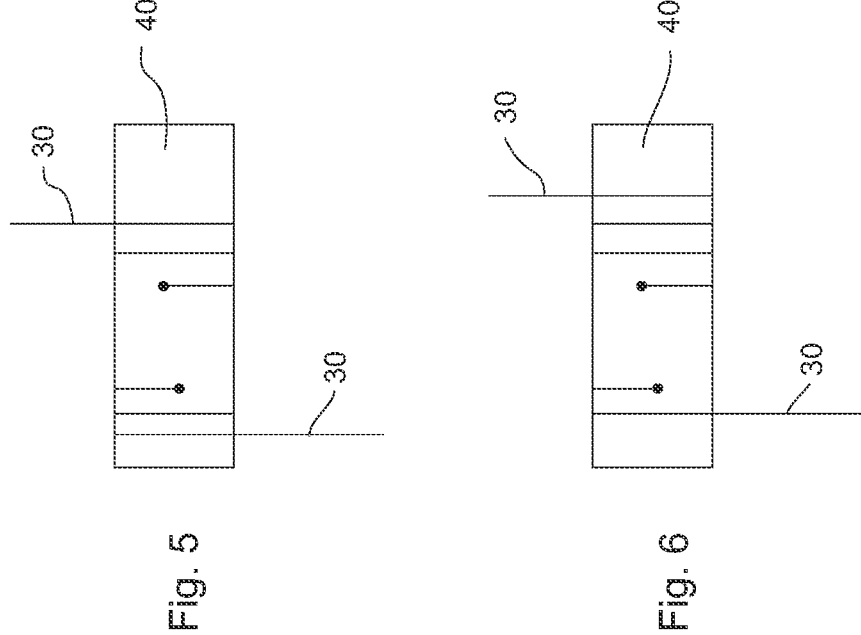
Fig. 5
Fig. 6

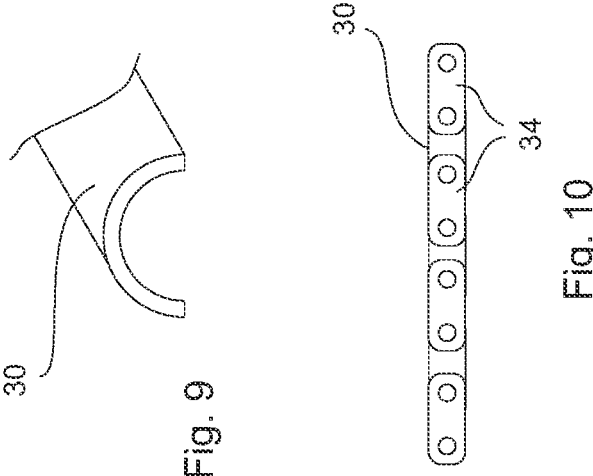
Fig. 9
Fig. 10
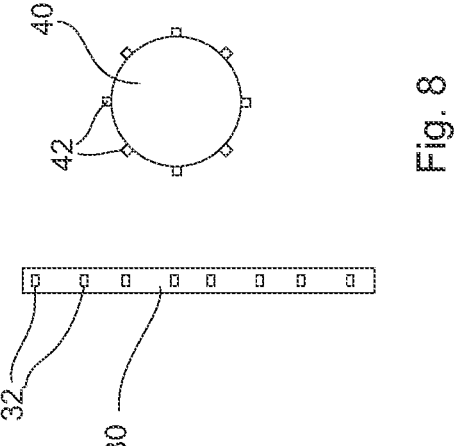
Fig. 8

DRIVE DEVICE FOR DRIVING A ROLLER BLIND DEVICE OF A FRAMELESS VEHICLE WINDOW

The present invention relates to a drive device for driving a roller device of a frameless vehicle window, and to a roller device for a frameless vehicle window with such a drive device.

It is known that vehicles are equipped with frameless windows to improve the appearance of the vehicle. This applies, for example, to so-called coupe vehicles or so-called gran coupe vehicles. In the case of vehicles with frameless windows, there are problems with regard to the installation of rollers for these vehicle windows. Usually in the case of frame afflicted doors, for example, a vehicle window roller is usually fixed to corresponding hooking elements in the frame of the vehicle window. For example, it is conceivable that a manual roller could be unwound from a winding shaft and then fixed in a cover position to corresponding fixing hooks in the frame of the window. Since there is no frame in a frameless vehicle window, no corresponding fixing means or no corresponding fixing hook can be arranged on such a frame. In known solutions, this leads to very elaborate measures in order to nevertheless equip frameless windows with a roller curtain. Usually, push cables are provided on both sides, which act as push elements to move a curtain rod of a roller curtain from a release position to the cover position and also hold it in this position. Manual solutions without an active drive are not yet known at all for frameless vehicle windows.

It is an object of the present invention to at least partially overcome the disadvantages described above. In particular, it is an object of the present invention to create, in a cost-effective and simple manner, a means of providing a driven roller curtain for frameless vehicle windows.

The above object is solved by a drive device with the features of claim 1 and a roller device with the features of claim 17. Further features and details of the invention result from the dependent claims, the description and the figures. Features and details described in connection with the drive device according to the invention naturally also apply in connection with the roller device according to the invention and vice versa in each case, so that reference is or can always be made mutually with respect to the disclosure of the individual aspects of the invention.

According to the invention, a drive device is designed for driving a roller device of a frameless vehicle window. For this purpose, such a drive device comprises a drive rod with an upper roller end for the fixation to a curtain rod of a roller curtain of the roller device. At the opposite end of the drive rod there is a covering end thereof. Thereby, the drive rod is movably supported between a cover position and a release position. The drive device further comprises a drive drum and an at least partially flexible drive means which is fixed to the roller end and/or to the covering end of the drive rod. This flexible drive means is at least partially arranged to wrap around the drive drum in a force-transmitting manner to ensure transmission of a drive force to the drive rod. This drive force on the drive rod serves to move this drive rod between the cover position and the release position during a rotation of the drive drum.

A solution according to the invention attempts to replace the previously known push elements and push cables. Thus, according to the invention, a combination of an at least partially flexible drive means and a corresponding drive drum is provided. The mode of operation can thereby be provided in the simplest manner by a corresponding fixing at the covering end and/or at the roller end. However, as will be explained later, it is preferable if either a separate drive is provided, an additional push mechanism is used, or a fixing is provided in both directions at the roller end and at the covering end.

In the simplest way, the fixing is provided only at the roller end or only at the lower covering end. The mode of operation is then as follows. If, for example, the roller curtain is in a release position, the roller curtain is, for example, rolled up on a winding shaft. In this release position, the frameless vehicle window is essentially open for viewing. In order to now move the roller curtain into a cover position, in which this roller curtain at least partially covers the frameless window, unwinding from such a winding shaft must take place. Irrespective of the use of a winding shaft, fixed roller curtains are of course also conceivable, which can be inserted into and pushed out of the side covering of the interior door of the vehicle.

A drive force is now required for the movement in the direction of the cover position, which is to be applied by the drive drum. For example, the at least partially flexible drive means, in particular in the form of a rope, is fixed to the lower covering end of the drive rod. In the release position, this now causes that this at least partially flexible drive means is wound around the drive drum during rotation of the drive drum. By shortening the distance between the drive roll and the flexible drive means tensioned in this way, the lower covering end of the drive rod is raised. Due to the fact that the drive rod at the opposite roller end is firmly fixed to the curtain rod of the roller curtain, in this way the drive rod pushes the roller curtain from the release position to the desired cover position. This movement is carried out until the cover position is reached, for example until the at least partially flexible drive means is completely or substantially completely wound onto the drive roll.

For the movement in the opposite direction, for example, another drive device can be provided. For example, the driven winding shaft explained later is conceivable, which can provide the corresponding return movement actively, motor-driven, but also provided with a spring motor. In the same way, however, it is also conceivable that the at least partially flexible drive means is also in a fixed state at the roller curtain end. This results in the fact that the drive force can now also be transmitted to the drive rod in the opposite direction. In other words, with the roller curtain in the cover position, the drive drum is now rotated in the opposite direction. This leads to a corresponding winding of the at least partially flexible drive means on the drive drum from above, so that the drive rod is, so to speak, pulled back from the cover position in the direction of the release position. The mode of operation is identical to that described above.

As will be explained later, in particular in the combination of the two above modes of operation, i.e. a connection of the at least partially flexible drive means at the roller end and at the covering end, a movement in opposite directions can be provided, i.e. an introduction of the drive force from the cover position into the release position and additionally from the release position into the cover position. At the same time, however, it is also conceivable that the corresponding drive force is only applied in one direction, while an additional force, for example in the form of a spring force, is provided in the opposite drive direction. Last but not least, it is also conceivable to apply the corresponding counterforce to the drive force at least partially in manual form.

Based on the above explanations, it is evident that with very simple and inexpensive means, a drive drum, a drive rod and an at least partially flexible drive means, a construction is provided which allows the use of a roller curtain even with frameless windows, and can be compactly integrated into a roller housing. In particular, this is independent of corresponding push rods as known from the prior art. A further advantage is the reduction of parts in such an embodiment, since in particular a single drive rod, which, as will be explained later, can be arranged centrally, for example, is sufficient. A further advantage is that in a drive device according to the invention, the location of the drive drum can be freely or substantially freely selected. Thus, in particular, an arrangement in the region directly below the frameless vehicle window is conceivable, so that the greater part of the interior space behind the covering of the door remains free or substantially free. A laterally offset arrangement of such a drive drum is also conceivable within the scope of the present invention, so that the flexibility in the arrangement and in the use of the installation space behind the covering of the side door of the vehicle can be increased and a compact design is enabled.

In a drive device according to the invention, the drive rod can comprise a wide variety of supporting options. For example, a simple sliding support is conceivable. More complex supporting arrangements, for example the use of a roller support, are also possible. Furthermore, the support can apply a transverse force to the drive rod, which is transmitted via the drive rod to the curtain rod and presses it against the window plane of the vehicle window. This is particularly the case in the at least one cover position and reduces the rattling probability of the curtain rod against the window plane. When applying such a transverse force, a roller support, for example with two rollers for the drive rod, is used in particular.

It can be further advantageous if, in a drive device according to the invention, a spring drive is provided for transmitting a spring force directed in the opposite direction to the drive force to the drive rod for a movement of the drive rod between the cover position and the release position. For example, as has been explained, if the drive force is used for a movement from the release position to the cover position, the spring force may act in the opposite direction and thus grant a force from the cover position to the release position. For example, a corresponding spring device or spring motor can be provided laterally on a winding shaft to be charged by the drive force when moving in the first direction, when in the opposite direction the spring force charged in this way discharges again and thus the desired spring force is available for the opposite movement. Support by the spring force can be provided in the same way as the complete execution of the corresponding counter movement by such a spring force.

It is also advantageous if, in a drive device according to the invention, the at least partially flexible drive means is fixed to the roller end and to the covering end. Particularly in the case of a design as a rope without any shear load capacity, this leads to the advantages described, namely that the drive force can be introduced into the roller curtain in the form of a tensile force in both directions of movement of the same. Thus, the drive rod can be pulled from the release position to the cover position by introducing the tensile force via the connection between the drive means and the covering end. In the opposite direction, i.e. for the movement from the cover position to the release position, a tensile force is also applied again as a drive force. However, this now engages at the roller end, i.e. at the upper end of the drive rod, while at the opposite end of the rope in the form of the drive means is pulled down through the covering end. In such a variant, the drive means thus wraps around the drive drum one or more times in order to transfer the rotational force of the drive drum and its movement to a corresponding linear translational movement of the flexible drive means. Such a possibility makes it possible to dispense with separate force inputs, for example the spring drive explained in the preceding paragraph.

It is further advantageous if, in a drive device according to the invention, the at least partially flexible drive means is formed at least partially as a rope. Such a variant is a particularly simple and cost-effective solution. In particular, this solution is combined with the preceding paragraph. A rope is in particular a low-shear or a shear-less rope which can transmit tensile forces exclusively or substantially exclusively. In addition to the simple and cost-effective design, a particularly light and flexible design is possible here. Last but not least, this also permits an even freer arrangement of the drive drum behind the covering of the interior door, in particular by using one or more additional deflector rolls. When using a rope, an enlarged wrap of more than 180°, in particular of more than 360°, can also be provided in order to prevent or at least reduce undesirable slippage during rotation of the drive drum relative to the drive means.

It is further advantageous if, in a drive device according to the invention, the at least partially flexible drive means wraps around the drive drum at least once, in particular more than once. Particularly in the case of the design as a rope according to the preceding paragraph, this brings advantages. For example, an increased number of wraps can increase the frictional force required to transmit the rotational force to the drive means during rotation of the drive drum. The smaller the corresponding drive means is designed, the greater the advantages that can be achieved with a multiple wrap of the drive drum. The risk of slipping can be significantly reduced in this way. The wraps can be guided wraps. For example, lateral wrap walls can be provided to ensure defined guidance of the path of the drive means on the drive drum. In particular, helical wrap walls are conceivable here. Furthermore, a thickening, for example in the form of a crimp, is also conceivable in such a rope in order to cooperate with a corresponding counter contour of the winding drum and thus prevent the rope from slipping or at least reduce the risk of slipping.

A further advantage can be achieved if, in a drive device according to the invention, the drive rod comprises a groove in which the at least partially flexible drive means runs at least partially. Such a groove can in particular serve to hide the drive means from optical view. Thus, this groove can be arranged in particular on the side of the drive rod which is directed towards the window in the cover position. However, other groove orientations or shapes are also conceivable in principle. Furthermore, the groove can additionally ensure a guiding function to support the insertion and removal of the drive means into the groove and the guiding along the drive rod. The groove is preferably formed over the entire length or substantially the entire length of the drive rod.

It is further advantageous if, in a drive device according to the invention, the at least partially flexible drive means comprises at least two separate subsections, both of which are fixed to the drive drum, wherein one of the two subsections is fixed to the roller end and the other of the two subsections is fixed to the covering end. Thus, a wrap is provided for each of the subsections, but a continuous working means is no longer required. On the contrary, unwanted slipping can be avoided in this way with maximum safety, since a firm fixation of the respective subsection to the drive drum is provided. In addition, the respective end position is also determined for the drive rod in a clear and predefined manner by the fixing position on the drive drum.

It is also advantageous if, in a drive device according to the invention, the drive drum comprises a drive motor, in particular for an electric motor drive of the drive drum. Such an electric motor can, for example, be designed as a flat-rotor motor. The connection may be provided directly or indirectly via a gear. It is preferred if the drive drum directly forms part of a rotor device of such an electromotive drive. This ensures a particularly simple and cost-effective and, above all, compact solution for the drive device. Further, it is conceivable within the scope of the present invention that the drive motor and the drive drum are arranged in a common drive housing. Such a drive housing may, for example, be formed from a plastic material or comprise a plastic material.

Further advantages can be achieved if, in a drive device according to the invention, one end of the flexible drive means can be fixed to a winding shaft of the roller device, in particular to a winding device of the winding shaft. The winding device, also referred to as a winding drum, can serve for fixing and for winding up the flexible drive means, in particular a rope. For this purpose, the winding device preferably comprises a fixing device for fixing one end of the flexible drive means. The winding device is preferably arranged at one end face of the winding shaft, in particular plugged onto the winding shaft or inserted into the winding shaft. In particular, the winding device is located stationary to the winding shaft. The winding shaft can be designed as a hollow profile body to accommodate the winding device. The winding device can comprise a bearing pin for insertion into the winding shaft. This results in a winding device also being provided for the drive means, in particular at the fixing position on the winding shaft. Thus, the desired drive force is provided by the rotation of the drive drum and, at the same time, a winding movement is transmitted to the winding shaft and thus to the winding device. Thus, so to speak, the roller curtain, via which the curtain rod is in a force-fitting connection to the winding shaft, represents an additional possibility of transmitting the drive force to the roller end of the drive rod. In such an embodiment, the end of the flexible drive means is preferably arranged at the covering end of the drive rod, so that, on the one hand, a tensile force can be introduced into the covering end via the drive means as a drive force for the extension movement into the cover position. In the opposite direction from the cover position into the release position, the corresponding drive force is applied as a tensile force via a rotational movement into the winding shaft and from this via the roller curtain into the curtain rod.

It is also advantageous if, in a drive device according to the invention, a tensioning device is provided for introducing a tensioning force into the at least partially flexible drive means. In particular, this can be a lateral guide function, which is designed to be spring-loaded, for example. Elongation of the drive means during operation can be compensated in this way. This tensioning device can act both passively and be actively adjustable, and in particular serve to apply a tensioning force laterally to the flexible drive means.

It is also advantageous if, in a drive device according to the invention, the at least partially flexible drive means is designed to be at least partially shear-stable. A shear-stable design permits the transmission of compressive forces as drive force. Thus, it is possible in this way to carry out a connection of the flexible drive means exclusively at the roller end or exclusively at the covering end and still dispense with correspondingly additional insertion options such as the insertion of a spring force. This also allows a further reduction in the number of components and the space required.

It can be advantageous if, in a drive device according to the invention, the at least partially flexible drive means is designed as a curved flat band. This is a variant of the shear-stable drive means described above. Thus, in particular, as is known from measuring tapes, a metallic material can be used to provide such a curved flat band. In particular, the curvature is present in the stretched position in order to transmit the corresponding shear forces. However, due to the fact that it is otherwise a flexibly deformable drive means, it is possible to wrap around the drive drum and even to wind up the drive means in such an embodiment.

It is also advantageous if, in a drive device according to the invention, the at least partially flexible drive means comprises at least partially form-locking elements for a form-locking interaction with counter form-locking elements of the drive drum. Such an embodiment allows an even better transmission of the drive force between the drive drum and the drive means. For example, a combination of holes and teeth is just as conceivable as corresponding hook elements. The risk of slipping is essentially completely eliminated by the mutual engagement of the form-locking elements with the counter form-locking elements.

A further advantage can be achieved if, in a drive device according to the invention, the at least partially flexible drive means comprises at least partially chain links for forming a push chain. This also permits a shear-stable design of the flexible drive means. Also, the individual chain links in combination may directly comprise the form-locking sections as described in the preceding paragraph. A design in this way allows the alignment and, above all, the positioning of the drive drum to be made even more flexible and, in particular, to permit a lateral offset of the same.

It can also be advantageous if, in a drive device according to the invention, a protective device for guideless protection of the drive rod and/or of the drive means is provided. Thus, a corresponding protective housing or a corresponding protective tube can be provided without contact or without guide. Separate protective devices for the drive rod and the drive means within the meaning of the present invention are also conceivable.

It is further advantageous if, in a drive device according to the invention, the drive rod is designed as a central, in particular axial, drive rod for a central, in particular axial, movement of the roller curtain. In particular, this is the only central arrangement, so that the overall design can be with fewer components and with less space requirement. Stability in the force transmission and in the drive force is also improved, since the lever arms can be designed to be the same or substantially the same in both directions on the roller curtain. Uniform extension and retraction between the cover position and the release position can be ensured in this way. In particular, a central application of force is possible in this way, so that swaying of the curtain rod is avoided or reduced. In particular, this avoids a pendulum movement against the vehicle window.

Further advantages can be achieved if, in a drive device according to the invention, at least one position stop is formed for the release position and/or for the at least one cover position for a mechanical provision of the associated position. Such a position stop is in particular the combination of mechanical position stops, which can be provided on the support of the drive drum, the drive rod or separately from these. Unwanted over-winding beyond the release position and/or beyond the cover position can be effectively prevented in this way.

It is also advantageous if, in a drive device according to the invention, at least one sensor device is provided for detecting at least one position of the drive rod relative to the roller device. This permits controlled operation of the overall system. Compensation of slippage situations or compensation of a slip situation is also conceivable. Last but not least, a calibration process can be started or carried out by such a sensor device.

It is further advantageous if, in a drive device, the flexible drive means comprises two separate subsections and the drive drum comprises two drum sections, wherein the first subsection of the drive means is fixed to the first drum section and a winding drum of a winding shaft, wherein the second subsection of the drive means is further fixed to the second drum section and the covering end of the drive rod. Thus, the drive means may comprise, for example, two ropes. In this way, for example, swaying of the curtain rod and/or the drive rod can be avoided or at least reduced. The first rope is thereby connected to the first drum section of the drive drum and thus, for example, to a drive motor. The other rope end is fixed to a winding shaft or a winding drum of the winding shaft. The second rope extends between the second drum section and the covering end. When the drive device is operated, simultaneous winding occurs on all drums. As the first rope winds on the first drum section, it simultaneously unwinds from and rotates the winding drum. Also, at the same time, the second rope is unwound from the second drum section, so that this operation corresponds to moving to the release position.

There are further advantages if, in a drive device according to the invention, the drive means, in particular a first subsection of the drive means and/or a second subsection of the drive means, is pre-tensioned by means of a tensioning device, so that in particular the roller curtain is subjected to a tensioning force via the tensioning device. The pretensioning can be effected, for example, by its lateral action. An action via a spring accumulator in one of the drum sections is also conceivable here. In this way, not only the drive means but also the roller curtain can be tensioned in addition to the drive means. A separate tensioning device for the roller curtain is then no longer necessary. Here, too, it is possible in principle for the tensioning device to be arranged with the drive drum in a common drive housing. If the drive drum comprises a drive motor, this is preferably also arranged in the drive housing. Such a drive housing can also be made of plastic material or comprise a plastic material.

Also an object of the present invention is a roller device for a frameless vehicle window of a vehicle. Such a roller device comprises a roller curtain which can be wound up and unwound on a winding shaft between a cover position and a release position. A drive device is provided in accordance with the invention and is provided for driving the roller curtain between the cover position and the release position. A roller device according to the invention has the same advantages as they have been explained in detail with reference to a drive device according to the invention.

Figure 1:
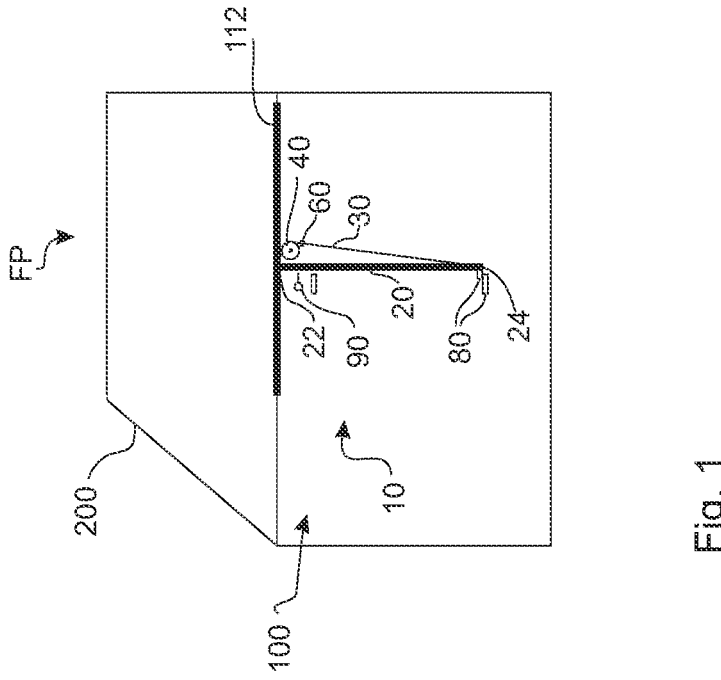
Figure 4:
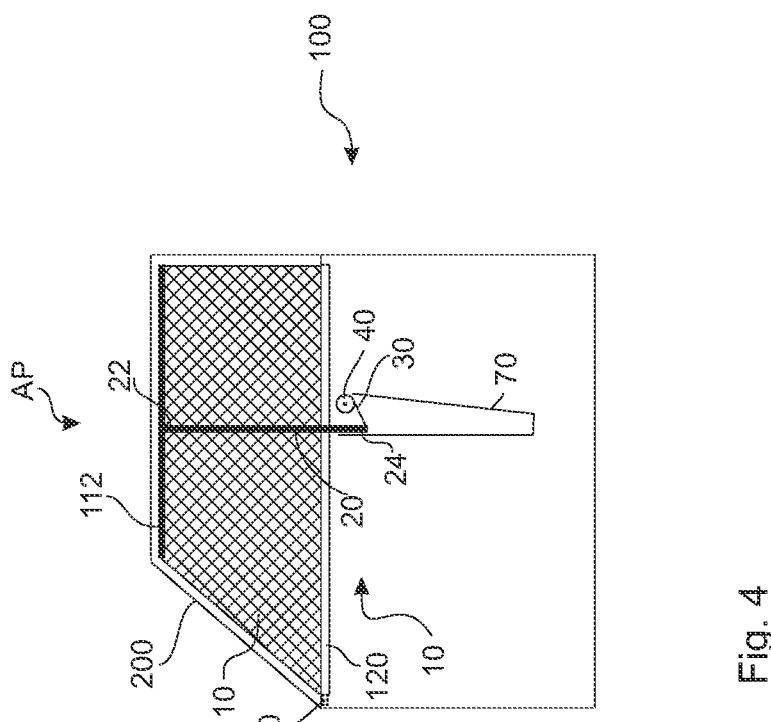
Figure 3:
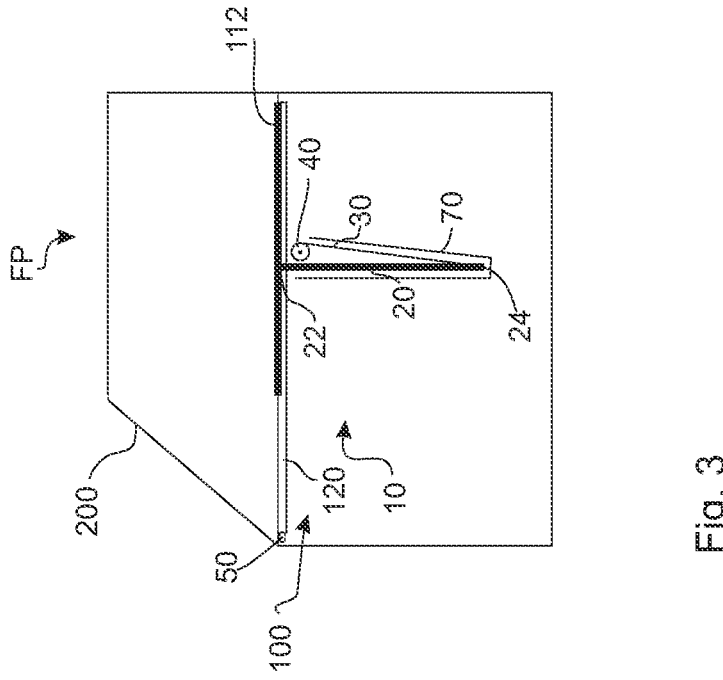
Figure 12:
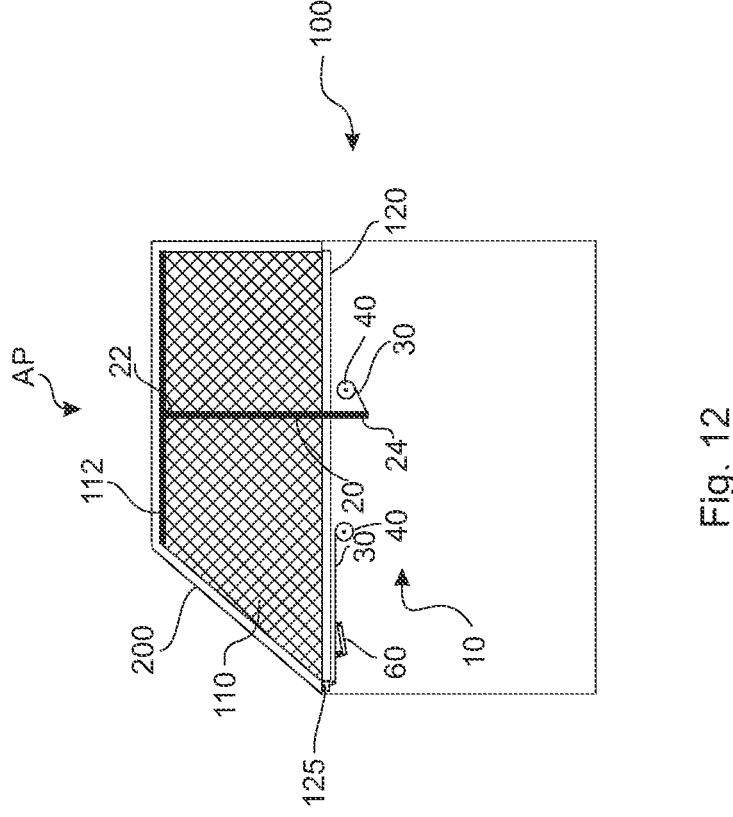
Figure 11:
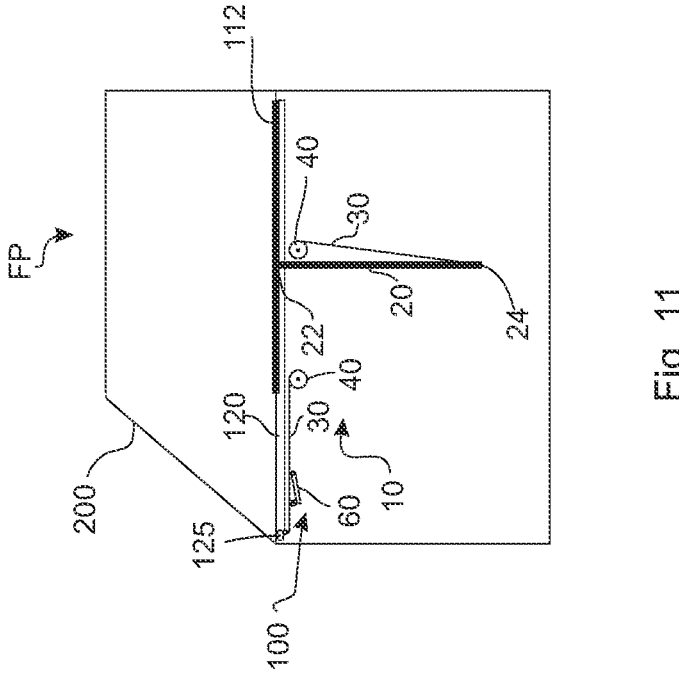

Further advantages, features and details of the invention will be apparent from the following description, in which embodiments of the invention are described in detail with reference to the figures. In this connection, the features mentioned in the claims and in the description may each be essential to the invention individually or in any combination. The figures schematically show:

FIG. 1 an embodiment of a drive device according to the invention in the release position, FIG. 2 the embodiment of FIG. 1 in the cover position, FIG. 3 a further embodiment of a drive device according to the invention in the release position, FIG. 4 the embodiment of FIG. 3 in the cover position, FIG. 5 an embodiment of a drive drum, FIG. 6 the embodiment of FIG. 5 in another drive state, FIG. 7 an embodiment of a drive device according to the invention, FIG. 8 an embodiment of form-locking elements, FIG. 9 an embodiment of a curved drive means, FIG. 10 an embodiment of a chain-shaped drive means, FIG. 11 another embodiment of a drive device, and FIG. 12 the drive device of FIG. 11 with the roller curtain in the cover position.

FIG. 1 schematically shows, together with FIG. 2, a first embodiment of a drive device 10 according to the invention. FIG. 1 shows the release position FP and FIG. 2 a cover position AP. In the embodiment of FIG. 1, the roller device 100 is designed to cover the vehicle window 200. For this purpose, a roller curtain 110 is provided, which is located in a covering position in front of the vehicle window 200 in the cover position AP according to FIG. 2. For a movement between the cover position AP and the release position FP, a drive device 10 is provided, which functions as follows:

In the normal state, the roller curtain 110 in the embodiment is in the release position FP as shown in FIG. 1. In order to perform a covering of the vehicle window 200, the drive device 10 is activated. For this purpose, a rotational movement is performed by a drive drum 40. Since a flexible drive means 30, here formed as a rope, is formed at least partially wrapped around the drive drum 40, the rotational movement leads to a winding on one side as well as an unwinding on the other side of the drive drum 40 for the drive means 30. Thereby, in the form of a tensile force, a driving force is transmitted to the connection at the covering end 24 of the drive rod 20 and a movement upwards from the release position FP according to FIG. 1 is generated. During this movement, the distance and thus also the rope length of the drive means 30 between the covering end 24 and the drive drum 40 is shortened and, on the opposite side, the rope length and the distance between the drive drum 40 and the roller end 22 is lengthened until the cover position AP according to FIG. 2 is reached. In order to prevent overrotation or a desired further movement, position stops 80 are provided here for both end positions according to FIG. 1 and FIG. 2.

For the reverse movement, i.e. the retraction of the roller curtain 110, the drive drum 40 is moved in the opposite direction of rotation so that the drive means 30 is now wound up or pulled from the roller end 22. A tensile force can be transmitted to the roller end 22 and thus to the drive rod 20, so that the latter is pulled downwards. At the same time, this downward movement of the drive rod 20 pushes the covering end 24 and thus also the other end of the drive means 30 which is fixed there, downwards, until the release position FP as shown in FIG. 1 has been reached again.

In order to make the entire movement, as explained in the preceding paragraph, controllable, a sensor device 90 is provided here. This can be designed, for example, as a Hall sensor, and is used to perform an accurate position determination of the drive rod between the cover position and the release position. In this way, differences or calibration errors can be detected and compensated for by appropriate control procedures. Furthermore, in the embodiment of FIGS. 1 and 2, a tensioning device 60 is provided which is capable of applying a tensioning force to the drive means 30 on the left and right, and thus laterally guiding. An undesired lengthening of the drive means 30 or a breaking out of the predetermined path can be avoided or at least reduced by such a tensioning device 60.

FIGS. 3 and 4 show a further embodiment of a drive device 10 according to the invention. This is based on the basic considerations for FIG. 1. However, here the drive means 30 is only fixed to the lower covering end 24 of the drive rod 20. For movement from the release position FP to the cover position AP, the drive means 30 winds around the drive drum 40 as it rotates. In doing so, the tensile force is applied as a drive force to the drive rod 22 at the covering end 24, pushing it upward. For the reverse movement, the drive drum 40 can exclusively release the drive means 30. If the weight of the drive rod 20 and the curtain rod 112 is not sufficient to produce the return movement to the release position, this can be assisted, for example, by a spring force from a spring device 50. In this embodiment, the spring device 50 acts on the winding shaft 120 of the roller device 100. Of course, it is also possible that winding of the drive means 30 additionally also takes place on the winding shaft 120, so that a corresponding tensile force can also be transmitted to the roller end 22 via the roller curtain 110. In the embodiment of FIGS. 3 and 4, a protective device 70 is also provided, which provides contactless and guideless engagement protection or clamping protection or tangling protection for the drive rod 20 and/or the drive means 30.

FIGS. 5 and 6 show the possibility of a two-part drive means 30. Here, an upper part of the drive means 30 is fixed at one end to the drive drum 40 and at the other end to the roller end 22. The second subsection is also fixed to the drive drum 40 and at its opposite end to the lower covering end 24. Thus, no deflection is performed, but simultaneous winding and unwinding is performed, as shown in the two winding states of FIGS. 5 and 6. The mode of operation here corresponds to the embodiments of FIGS. 1 to 2.

FIG. 7 shows one way in which the drive means 30 can be guided in a hidden manner. For this purpose, the drive rod 20 comprises a groove 26 in which the drive means 30 runs at least partially. When the drive rod is arranged, the groove is preferably directed towards the vehicle window 200 so that the drive means 30 cannot be seen from the inside of the vehicle or can only be seen with difficulty.

FIG. 8 illustrates the possibility of a form-locking force transmission. For example, the drive drum 40 can comprise counter form-locking elements 42 here, which engage in a tooth-like manner in corresponding openings as form-locking elements 32 in the drive means 30. This variant can of course be combined with the embodiments of FIGS. 1 to 4, but also of FIGS. 9 and 10.

FIG. 9 shows a shear-stable design as can be used in particular in a solution of FIGS. 3 to 4, especially when no spring device 50 can or should be used. This shear-stable drive means 30 is designed here as a curved metal band in order to be able to ensure the desired shear transmission. Also shear-transmitting and thus thrust-shear is the design according to FIG. 10. Here the drive means 30 is provided in the form of individual chain links 34. The individual chain links 34 can simultaneously provide a form-locking engagement, as explained with reference to FIG. 8.

FIGS. 11 and 12 show yet another embodiment of a drive device according to the invention. Here, the drive drum 40 is divided into two drum sections. The drive means 30 is also divided into two subsections. Here, the left subsection of the drive means 30 extends as a rope between the left drum section of the drive drum and a winding drum, i.e. a winding device 125, of the winding shaft 120. The winding device 125 serves for fixing and for winding up the drive means 30, in particular the rope. For this purpose, the winding device 125 may comprise a fixing device for fixing one end of the flexible drive means 30. The winding device 125 may be arranged at a front end of the winding shaft 120, in particular may be plugged onto the winding shaft 120 or inserted into the winding shaft 120. In particular, the winding device 125 is stationary fixed to the winding shaft 120. Thus, this subsection of the drive means 30 can rotate the winding device 125 and thus the winding shaft 120 and thus in particular perform or at least support a winding of the roller curtain 110 from the cover position AP of FIG. 12 into the release position FP of FIG. 11. The right subsection of the drive means 30 extends between the right drum section of the drive drum 40 and the covering end 24 of the drive rod 20. This subsection in particular introduces the drive force for the movement from the release position FP to the cover position AP into the drive rod 20 and thus performs or supports this movement. A combination of the two drum sections into a common drive drum 40 is also conceivable in principle. Further, these two FIGS. 11 and 12 show a possibility of a tensioning device 60, which here acts on the drive means 30. This applied tensioning force is passed on in particular via the winding shaft 120 into the roller curtain 110, so that not only tensioning of the drive means 30 but also of the roller curtain 110 is effected with a single tensioning device 60. A separate tensioning device 60 for the roller curtain is then no longer necessary, which further increases the compactness of the drive device 10.

The foregoing explanation describes the present invention exclusively in the context of examples. Of course, individual features of the embodiments can be freely combined with each other, provided that this is technically reasonable, without leaving the scope of the present invention.

REFERENCE SIGNS

10 drive device
  20 drive rod
  22 roller end
  24 covering end
  26 groove
  30 drive means
  32 form-locking element
  34 chain links
  40 drive drum
  42 counter form-locking elements
  50 spring drive
  60 tensioning device
  70 protective device
  80 position stop
  90 sensor device
  100 roller device
  110 roller curtain
  112 curtain rod
  120 winding shaft
  125 winding drum/winding device
  200 vehicle window
  AP cover position
  FP release position

The invention claimed is:

1. A drive device for driving a roller device of a frameless vehicle window, comprising a drive rod with an upper roller end for the fixation to a curtain rod of a roller curtain of the roller device and a lower covering end, wherein the drive rod is movably supported between a cover position and a release position, further comprising a drive drum assembly that comprises a first drum section and a second drum section, and an at least partially flexible drive element that comprises a first drive element subsection and a second drive element subsection, wherein the first drive element subsection is fixed at a first end to the covering end of the drive rod and at a second end to the first drum section, and at least partially wraps around the first drum section in a force-transmitting manner for transmitting a drive force to the drive rod for a movement of the drive rod between the release position and the cover position during a rotation of the first drum section, and wherein the second drive element subsection is fixed at a first end to a winding drum of a winding shaft of the roller device and at a second end to the second drum section.

2. The drive device according to claim 1, wherein the at least partially flexible drive element is formed at least partially as a rope.

3. The drive device according to claim 1, wherein the at least partially flexible drive element wraps around the first drum section at least once.

4. The drive device according to claim 1, wherein the drive rod comprises a groove in which the first drive element subsection runs at least partially.

5. The drive device according to claim 1, wherein the first drive drum section comprises a drive motor.

6. The drive device according to claim 1, wherein the at least partially flexible drive element is configured as at least partially shear-stable.

7. The drive device according to claim 1, wherein the at least partially flexible drive element is configured as a curved flat band.

8. The drive device according to claim 1, wherein the at least partially flexible drive element comprises at least partially form-locking elements for a form-locking interaction with counter form-locking elements of at least the first drum section.

9. The drive device according to claim 1, wherein the at least partially flexible drive element comprises at least partially flexible chain links for forming a push chain.

10. The drive device according to claim 1, further comprising a protective device for guideless protection at least of the drive rod or of the at least partially flexible drive element.

11. The drive device according to claim 1, wherein the drive rod is configured as a central drive rod for a central movement of the roller curtain.

12. The drive device according to claim 1, further comprising at least one position stop formed to control rotation of the first drum section or movement of the drive rod.

13. The drive device according to claim 1, wherein at least one sensor device is provided for detecting at least one position of the drive rod relative to the roller device.

14. The drive device according to claim 1, wherein the second drive element subsection is pre-tensioned by means of a tensioning device.

15. The drive device according to claim 1, further comprising a spring device positioned laterally on the winding shaft, the spring device transmitting a spring force directed opposite the drive force to assist in movement of the drive rod from the cover position to the release position.

16. The drive device according to claim 1, wherein a tensioning device for introducing a tensioning force into the second drive element subsection is arranged laterally of the drive rod and below the curtain rod.

17. A roller device for a frameless vehicle window of a vehicle, comprising a roller curtain which can be wound up and unwound on a winding shaft between a cover position and a release position, and a drive device for driving the roller curtain of the frameless vehicle window, wherein the drive device comprises a drive rod with an upper roller end for the fixation to a curtain rod of the roller curtain and a lower covering end, wherein the drive rod is movably supported between the cover position and the release position, wherein the drive device further comprises a drive drum assembly that comprises a first drum section and a second drum section, and an at least partially flexible drive element that comprises a first drive element subsection and a second drive element subsection, wherein the first drive element subsection is fixed at a first end to the covering end of the drive rod and at a second end to the first drum section, and at least partially wraps around the first drum section in a force-transmitting manner for transmitting a drive force to the drive rod for a movement of the drive rod between the release cover position and the cover position during a rotation of the first drum section to drive the roller curtain between the release position and the cover position, and wherein the second drive element subsection is fixed at a first end to a winding drum of the winding shaft of the roller device and at a second end to the second drum section, wherein a center of the first drum section is offset laterally from the drive rod along an axis parallel to the curtain rod, and the laterally offset first drum section rotates about a rotation axis that is perpendicular to the curtain rod.

* * * * *